United States Patent
Song et al.

[11] Patent Number: 6,132,863
[45] Date of Patent: Oct. 17, 2000

[54] MAGNETIC RECORDING MEDIUM WITH GRAIN SIZE CONTROL LAYER

[75] Inventors: Xing Song, Mountain View; Qixu Chen, Milpitas; Charles Leu, Fremont; Rajiv Y. Ranjan, San Jose, all of Calif.

[73] Assignee: Seagate Technology LLC, Scotts Valley, Calif.

[21] Appl. No.: 09/161,427

[22] Filed: Sep. 24, 1998

Related U.S. Application Data

[60] Provisional application No. 60/069,572, Dec. 12, 1997.

[51] Int. Cl.$^7$ .................................................. G11B 5/66
[52] U.S. Cl. ................. 428/332; 428/336; 428/694 TS; 428/900
[58] Field of Search ............... 428/694 TS, 332, 428/336, 900

[56] References Cited

U.S. PATENT DOCUMENTS

| | | | |
|---|---|---|---|
| 4,833,020 | 5/1989 | Shiroishi | 428/336 |
| 5,456,978 | 10/1995 | Lal | 428/332 |
| 5,879,783 | 3/1999 | Chang | 428/141 |
| 5,968,679 | 10/1999 | Kobayashi | 428/694 TS |
| 6,045,931 | 4/2000 | Song | 428/694 TS |

*Primary Examiner*—Leszek Kiliman
*Attorney, Agent, or Firm*—McDermott, Will & Emery

[57] ABSTRACT

Simultaneous crystallographic orientation and grain size refinement of the magnetic layer are achieved by depositing a grain size control layer on a underlayer. Embodiments include depositing a CrV grain size control layer on a Cr underlayer at thickness ratio of underlayer to grain size control layer of about 0.5 to about 2. Magnetic layers having a grain size of about 100 Å to about 250 Å, e.g. at 180 Å to about 220 Å, are achieved.

10 Claims, 4 Drawing Sheets

MAGNETIC RECORDING MEDIUM WITH GRAIN SIZE CONTROL LAYER

RELATED APPLICATIONS

This application claims priority from Provisional Application Serial No. 60/069,572 filed on Dec. 12, 1997 entitled "MAGNETIC THIN FILM MEDIA WITH A GRAIN SIZE CONTROL LAYER", the entire disclosure of which is hereby incorporated herein by reference.

TECHNICAL FIELD

The present invention relates to magnetic recording media, such as thin film magnetic recording disks, and to a method of manufacturing the media. The invention has particular applicability to high areal density magnetic recording media exhibiting low noise and high remanent coercivity.

BACKGROUND ART

The requirements for increasingly high areal recording density impose increasingly greater demands on thin film magnetic recording media in terms of remanent coercivity (Hr or Hcr), magnetic remanance (Mr), coercivity squareness (S*), medium noise, i.e., signal-to-noise ratio (SNR), and narrow track recording performance. It is extremely difficult to produce a magnetic recording medium satisfying such demanding requirements.

The linear recording density can be increased by increasing the Hr of the magnetic recording medium. However, this objective can only be accomplished by decreasing the medium noise, as by maintaining very fine magnetically non-coupled grains. Medium noise is a dominant factor restricting increased recording density of high density magnetic hard disk drives. Medium noise in thin films is attributed primarily to inhomogeneous grain size and intergranular exchange coupling. Accordingly, in order to increase linear density, medium noise must be minimized by suitable microstructure control.

A conventional longitudinal recording disk medium is depicted in FIG. 1 and comprises a substrate 10, typically an aluminum (Al)-alloy, such as an Al-magnesium (AlMg) alloy plated with a layer of amorphous nickel—phosphorus (NiP). Alternative substrates include glass, ceramic and glass-ceramic materials, as well as graphite. There are typically sequentially sputter deposited on each side of substrate 10 an underlayer 11, 11', such as Cr or a Cr alloy, a magnetic layer 12, 12', such as a cobalt (Co)-based alloy, and a protective overcoat 13, 13', such as a carbon-containing overcoat. Typically, although not shown for illustrative convenience, a lubricant topcoat is applied on the protective overcoat 13, 13'.

It is recognized that the magnetic properties, such as Hr, Mr, S* and SNR, which are critical to the performance of a magnetic alloy film, depend primarily upon the microstructure of the magnetic layer which, in turn, is influenced by the underlying layers, such as the underlayer. It is also recognized that underlayers having a fine grain structure are highly desirable, particularly for growing fine grains of hexagonal close packed (HCP) Co alloys deposited thereon.

Conventional practices in manufacturing magnetic recording media comprise Direct Current (DC) magnetron sputtering and high temperatures in order to obtain Cr segregation in Co-alloy grain boundaries to achieve high Hr and high SNR. Conventional practices, therefore, employ a high substrate heating temperature, e.g. above about 200° C., e.g. about 230° C. to about 260° C., in order to achieve a desirably high Hr. However, such high substrate heating temperatures result in a reduced S* and, hence, increased medium noise. In order to increase information storage capacity, recording media with higher Hr and lower medium noise are manifestly required. Higher Hr narrows the pulse width, thereby enabling reduction of the bit length for higher recording density, while lower media noise leads to higher SNR.

In order to increase Hr, magnetic alloys containing platinum (Pt), such as Co—Cr—Pt—tantalum (Ta) alloys have been employed. Although Pt enhances film Hr, it was found that Pt also increases media noise. Accordingly, it has become increasingly difficult to achieve high areal recording density while simultaneously achieving high SNR and high Hr.

As media noise predominately stems from exchange and magnetostatic interactions among magnetic grains, SNR can be improved by minimizing such interactions. For example, such interactions can be suppressed by separating or segregating the magnetic grains either physically or chemically. Prior efforts in this area, however, have dealt with relatively low Hr media, e.g. less than about 2,000 Oe. Little effort, to date, has been devoted to increasing Hr and simultaneously reducing media noise for high areal recording density medium.

Conventional practices in manufacturing magnetic recording media comprise depositing a Cr underlayer, particularly for thin film media for longitudinal recording. The Cr underlayer provides a favorably crystallographic structure, such that the magnetic alloy layer subsequently deposited thereon, such as a Co-alloy layer, can nucleate with the c-axis of the HCP structure in-plane on virtually in-plane via grain to grain epitaxy. However, as the drive for higher and higher areal recording density increases and film thickness decreases, it becomes increasingly difficult to satisfactorily reduce the grain size of the magnetic layer and to decrease intergranular coupling in order to achieve satisfactory media noise reduction.

Accordingly, there exist a need for high areal density magnetic recording media exhibiting a high Hr and a high SNR.

DISCLOSURE OF THE INVENTION

An advantage of the present invention is a magnetic recording medium for high areal recording density exhibiting low noise and high Hr.

According to the present invention, the foregoing and other advantages are achieved by a magnetic recording medium comprising: a non-magnetic substrate; a Cr underlayer on the non-magnetic substrate; a chromium—vanadium (CrV) alloy grain size control layer on the chromium underlayer; and a magnetic layer on the CrV grain size control layer.

Another aspect of the present invention is a magnetic recording medium comprising: a non-magnetic substrate; a Cr underlayer on the non-magnetic substrate; a CrV grain size control layer on the Cr underlayer; and a magnetic layer on the CrV grain size control layer, wherein the ratio of the thicknesses of the Cr underlayer to the chromium—vanadium grain size control layer is about 0.5 to about 2, and the magnetic layer has a grain size of about 100 Å to about 250 Å.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature, and not as restrictive.

DESCRIPTION OF THE INVENTION

The present invention provides magnetic recording media suitable for high areal recording density exhibiting high Hr and SNR. The present invention achieves that objective by strategically employing a grain size control layer on an underlayer and depositing the magnetic layer on the grain size control layer. Thus, the present invention constitutes a new approach in obtaining a desired crystallographic orientation in thin film media and simultaneously achieving grain refinement of the magnetic film by grain to grain epitaxy. Advantageously, any conventional substrate material can be employed in the embodiments of the present invention, including glass, ceramic, glass-ceramic materials, silicon, plastics, as well as a conventional NiP-coated Al or Al-alloy substrates.

Embodiments of the present invention comprise depositing a Cr underlayer on a non-magnetic substrate and depositing a grain size control layer, e.g. a chromium—vanadium (CrV) alloy on the Cr underlayer. The CrV alloy layer can comprise an alloy of Cr and about 10 to about 50 at. % V. The Cr underlayer and CrV grain size control layer can be deposited by conventional sputtering methodology. The magnetic layer employed in embodiments of the present invention can comprise any magnetic alloy layer conventionally employed in the manufacture of magnetic recording media, such as a Co-alloy, e.g. a Co—Cr—tantalum (Ta) alloy, e.g. $Co_{82}Cr_{14}Ta_4$.

Embodiments of the present invention include sputter depositing the Cr underlayer and CrV grain size control layer so that the thickness ratio of the Cr underlayer to the CrV grain size control layer is about 0.5 to about 2. Embodiments of the present invention include sputter depositing the Cr underlayer at a thickness of about 100 Å to about 1000 Å, e.g. about 350 Å to about 500 Å, and sputter depositing the CrV grain size control layer at a thickness of about 100 Å to about 500 Å, e.g. about 150 Å to about 200 Å. Embodiments of the present invention yield a magnetic recording media comprising a magnetic layer exhibiting a grain size of about 100 Å to about 250 Å, e.g. about 180 Å to about 220 Å.

Figure 1:
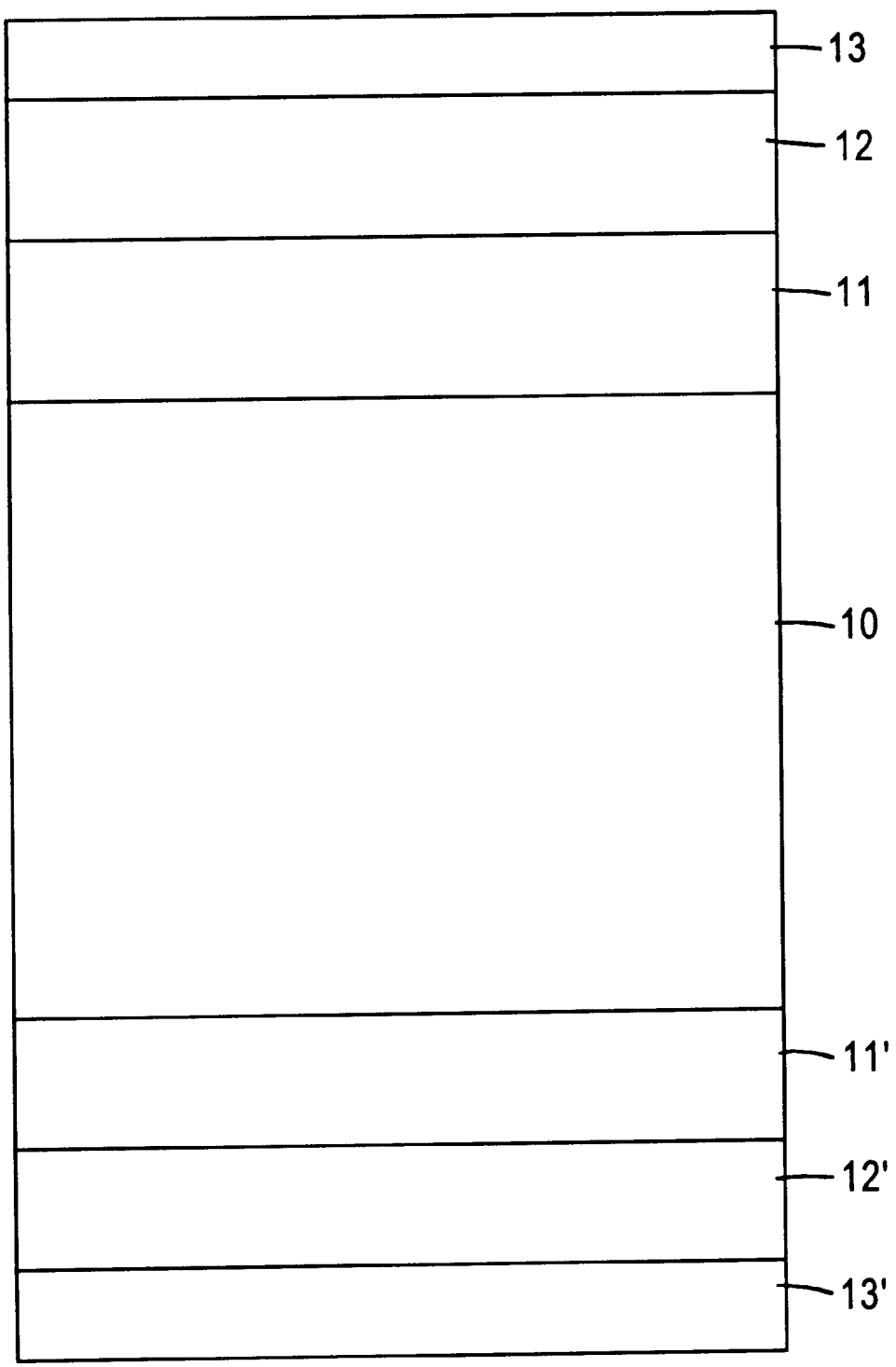
FIG. 1 schematically depicts a conventional magnetic recording medium structure.
Figure 2:
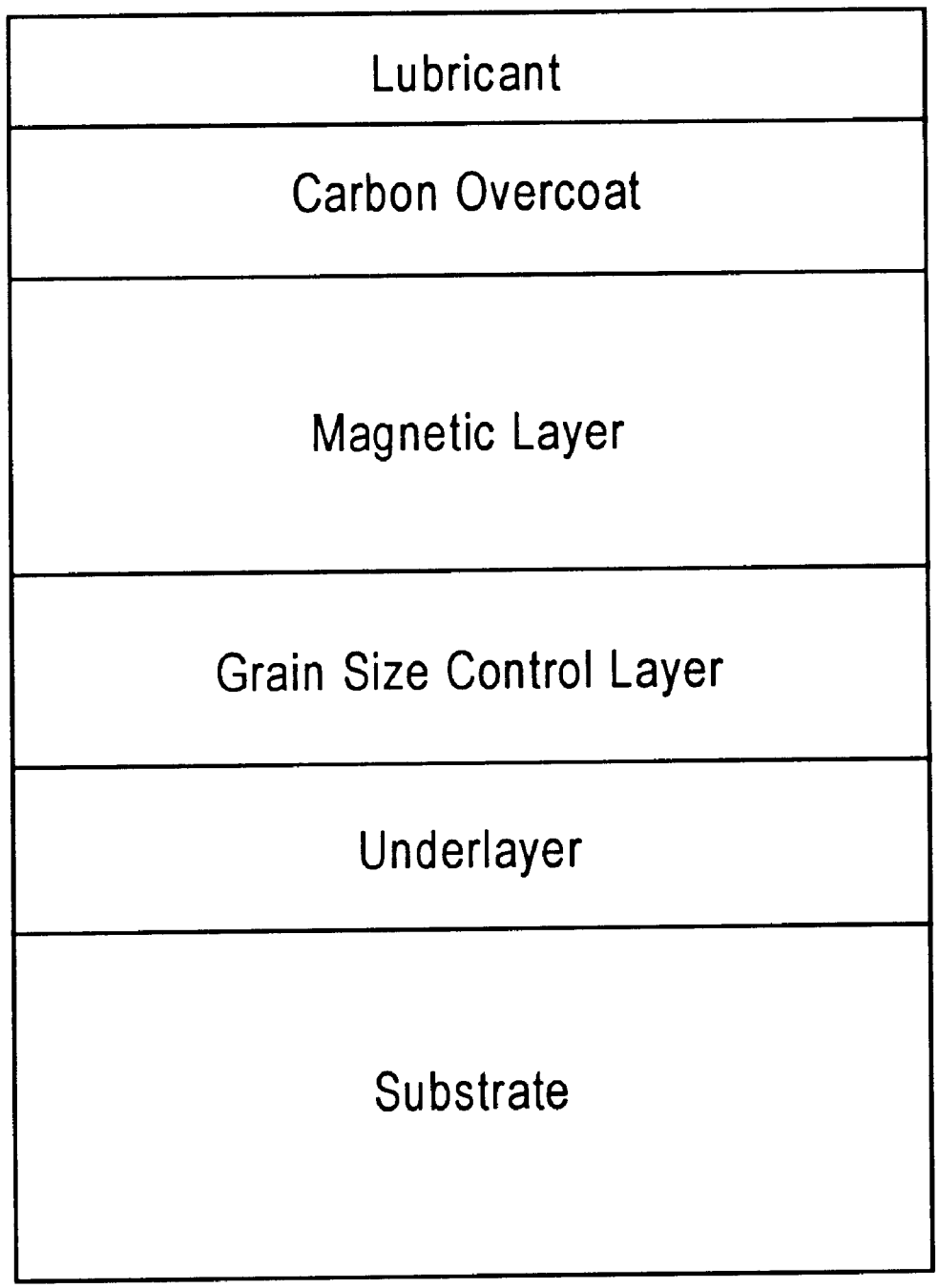
FIG. 2 schematically depicts a magnetic recording medium in accordance with an embodiment of the present invention.

An embodiment of the present invention is schematically illustrated in FIG. 2, and comprises a substrate which can be any material conventionally employed in the manufacture of magnetic recording media, such as a NiP-plated Al or Al alloy, or a glass, ceramic or a glass-ceramic material. For illustrative convenience, the sequentially deposited layers are shown only on one side of the substrate. However, it is understood that the present invention comprises sputter depositing sequentially layers on both sides of the substrate, as in FIG. 1.

Adverting to FIG. 2, an underlayer, e.g. Cr, is sputter deposited on the substrate. A thin grain size control layer, e.g. CrV, is then sputter deposited on the underlayer. The magnetic layer, e.g., a CoCrTa alloy layer, is sputter deposited on the grain size control layer. Subsequently, a carbon overcoat is sputter deposited on the magnetic layer. A lubricant topcoat is then applied to the carbon overcoat in a conventional manner.

The present invention advantageously simultaneously achieves a desired crystallographic orientation of the c-axis of the HCP structure of the magnetic layer in-plane or virtually in-plane via grain to grain epitaxy and grain refinement of the magnetic layer. Advantageously, the film magnetic layer exhibits a grain size considerably less than that obtained in a conventional manner wherein a high Hr is obtained by employing high substrate heating temperatures which disadvantageously enhance grain growth. In accordance with the present invention, however, a grain size control layer is sputter deposited on the initial Cr underlayer before deposition of the magnetic layer. This additional grain size control layer provides grain refinement and surface morphology for the nucleation and growth of the magnetic layer resulting in significantly increased SNR.

Figure 3:
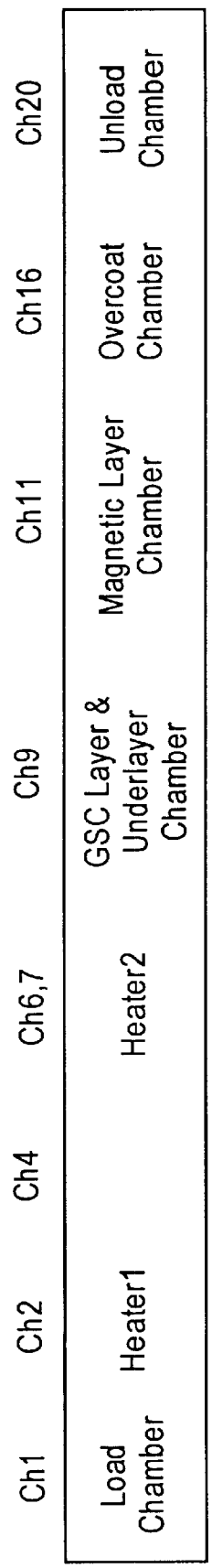
FIG. 3 schematically illustrates a sputtering system for use in the present invention.

A schematic illustration of an in-line sputtering system for use in embodiments of the present invention is depicted in FIG. 3. Adverting to FIG. 3, a pallet containing multiple discs is initially introduced into load chamber (Ch1) and passed to the heating chamber (Ch 2). The pallet is heated in route (e.g. Ch6,7) to the deposition chamber (Ch9) in which the Cr underlayer is deposited. In the deposition chamber (Ch9), the CrV grain size control layer (GSC) layer is deposited, e.g. immediately after depositing the Cr underlayer. Embodiments include depositing the CrV grain size control within 4 seconds of depositing the Cr underlayer. The pallet is then transferred to another deposition chamber (Ch11) in which the magnetic layer is deposited, then transferred to another deposition chamber (Ch16), in which a protective overcoat, e.g. carbon, is subsequently deposited on the magnetic layer. The pallet is then transferred to unload chamber (Ch20). The numerical chamber designations are merely used for convenience and do not necessarily represent the number of chambers or any particular chamber sequence.

EXAMPLE

Three groups of eleven sample thin film magnetic recording media (disks) were fabricated in an in-line production sputtering system as schematically illustrated in FIG. 3 employing the sputtering conditions set forth in Table I below, which shows the pallet speed in different process chambers in terms of feet per minute (fpm), power on the targets at different target positions (pos.) in terms of KW and heating time in the soak chambers in terms of seconds (s).

TABLE I

| | | | Chamber 9 (10.2 fpm) | | |
|---|---|---|---|---|---|
| | | | Pos. #1 and #2, Cr | Pos. #3 CrV | Pos. #4, CoCr$_{14}$Ta$_4$ |
| Soak I 20s | Soak II 10–25 s | Pass-By 8 fpm | 7 KW | 7 KW | 1.3 KW |
| Chamber 11 (15.9 fpm) | | Chamber 11 | | Chamber 16 (7.7 fpm) | |
| Pos. #5 and #6, CoCr$_{14}$Ta$_4$ 7.5 KW | | Pos. #7 and #8, CoCr$_{15}$Pt$_5$Ta$_4$ 7.5 KW | | Carbon 9.5 KW | |

In each of the disks, the substrate was NiP-plated Al and the magnetic layer employed was Cr$_{82}$ Cr$_{14}$ Ta$_4$ having an Mrt (magnetic remenance times the thickness) of about 0.8 memu/cm$^2$. Group 1 contained four sample disks; Group 2 contained four sample disks; and Group 3 contained 3 sample disks. The disks of Group 1 contained an underlayer of Cr deposited at a thickness of about 500 Å. The disks of Group 2 contained an underlayer of CrV deposited at a thickness of about 500 Å. In Group 3, representative of the present invention, a Cr underlayer of about 350 Å was deposited and an additional grain size control layer of CrV, having a thickness of about 150 Å, was deposited on the Cr underlayer. The sputtering conditions employed for deposition of all the disks were identical, except that an additional CrV grain size control layer was deposited on the Cr underlayer of the Group 3 disks before deposition of the magnetic layer.

Figure 4:
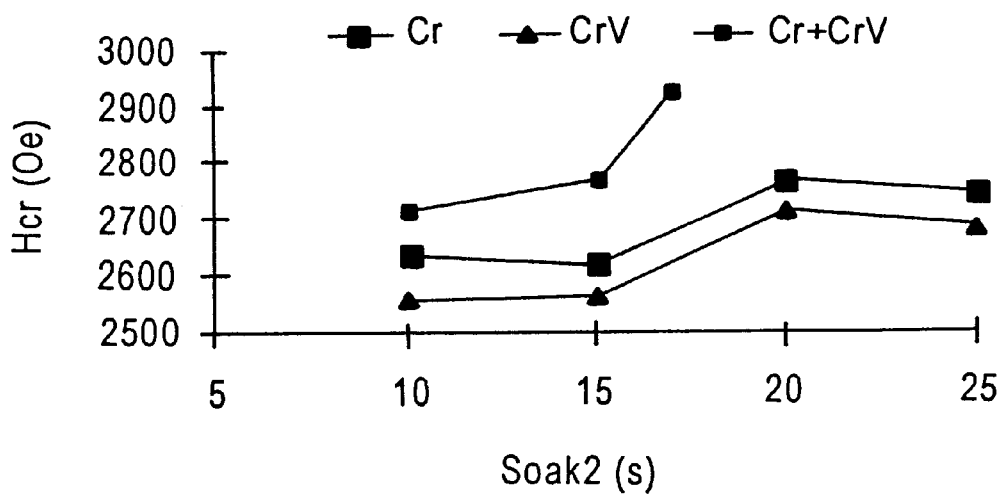
FIG. 4 contains plots of Hr as a function of substrate heating time for a magnetic recording medium in accordance with the present invention vis-à-vis comparison magnetic recording media.
Figure 5:
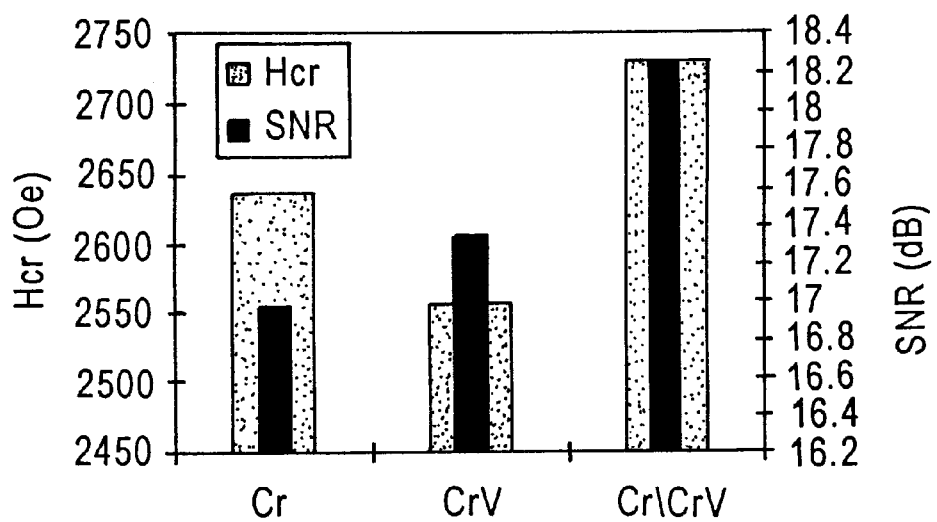
FIG. 5 illustrates superior SNR achieved by a magnetic recording media of the present invention vis-à-vis comparison media.

FIG. 4 shows Hr as a function of substrate heating time curves for the three groups of sample disks. It is apparent from FIG. 4 that the application of an additional 150 Å CrV grain size control layer on the 350 Å Cr underlayer in accordance with the present invention created the strongest impact by enhancing the Hr of the magnetic film. This strong effect is due to the combined contribution from the strong crystalline anisotropy originating from a (002) crystallographic texture in the Cr underlayer and a smaller intergranular exchange coupling originating from a smaller grain feature and, hence, a larger grain boundary area for atomic diffusion which is induced by the 150 Å CrV grain size control layer. Grain size reduction and decrease of intergranular exchange coupling are essential in media noise reduction. Adverting to FIG. 5, it is apparent that the Group 3 disks exhibit the highest SNR.

The present invention stems from a novel approach to obtaining a desired crystallographic orientation in thin film media while simultaneously refining the grain size of the underlayer and, hence, the grain size of the magnetic film through grain to grain epitaxy during which a significant reduction in intergranular exchange coupling is created, thereby decreasing media noise. The grain size control layer employed in embodiments of the present invention provides grain refinement and surface morphology for the nucleation and growth of a magnetic layer, resulting in a significantly increased SNR.

The present invention provides high areal density magnetic recording medium having a high Hr and high SNR. The present invention is applicable to the production of various types of magnetic recording media, and is not limited to any particular substrate material, underlayer, magnetic layer, protective overcoat or lubricant topcoat.

Only certain embodiments of the present invention and but a few examples of its versatility are shown and described in the present disclosure. It is to be understood that the present invention is cable of use in various other combinations and environments and is capable of changes and modifications within the scope of the inventive concept as expressed herein.

What is claimed is:

1. A magnetic recording medium comprising:

a non-magnetic substrate;

a chromium underlayer on the non-magnetic substrate;

a chromium—vanadium alloy grain size control layer on the chromium underlayer; and a magnetic layer on the chromium—vanadium grain size control layer, wherein the magnetic layer has a grain size of about 100 Å to about 250 Å.

2. The magnetic recording medium according to claim 1, wherein the ratio of the thickness of the chromium underlayer to the chromium—vanadium grain size control layer is about 0.5 to about 2.

3. The magnetic recording medium according to claim 2, wherein:

the chromium underlayer has a thickness of about 100 Å to about 1000 Å; and the chromium—vanadium grain size control layer has a thickness of about 100 Å to about 500 Å.

4. The magnetic recording medium according to claim 3, wherein;

the chromium underlayer has a thickness of about 350 Å to about 500 Å; and the chromium—vanadium grain size control layer has a thickness of about 150 Å to about 200 Å.

5. The magnetic recording medium according to claim 1, wherein the magnetic layer comprises a alloy of cobalt, chromium and tantalum.

6. The magnetic recording medium according to claim 1, wherein the underlayer has a (002) crystallographic texture.

7. The magnetic recording medium according to claim 1, wherein the magnetic layer has a grain size of about 180 Å to about 220 Å.

8. The magnetic recording medium according to claim 1, wherein the underlayer consists essentially of chromium.

9. The magnetic recording medium according to claim 5, wherein the magnetic layer has a grain size of about 180 Å to about 220 Å.

10. The magnetic recording medium according to claim 2, wherein the magnetic layer comprises a alloy of cobalt, chromium and tantalum.

\* \* \* \* \*